(12) United States Patent
Watarai et al.

(10) Patent No.: US 9,429,203 B2
(45) Date of Patent: Aug. 30, 2016

(54) DISC BRAKE ROTOR

(71) Applicant: SHIMANO Inc., Sakai, Osaka (JP)

(72) Inventors: Etsuyoshi Watarai, Izumi (JP); Masashi Goto, Sakai (JP); Takuya Edamura, Sakai (JP)

(73) Assignee: SHIMANO Inc., Osaka (JP)

( * ) Notice: Subject to any disclaimer, the term of this patent is extended or adjusted under 35 U.S.C. 154(b) by 1 day.

(21) Appl. No.: 14/511,419

(22) Filed: Oct. 10, 2014

(65) Prior Publication Data

US 2016/0102719 A1    Apr. 14, 2016

(51) Int. Cl.
*F16D 65/12* (2006.01)
*F16D 65/847* (2006.01)

(52) U.S. Cl.
CPC ........... *F16D 65/128* (2013.01); *F16D 65/125* (2013.01); *F16D 65/847* (2013.01)

(58) Field of Classification Search
CPC ............... F16D 2055/0004; F16D 2055/0075; F16D 65/00; F16D 65/005; F16D 65/02; F16D 65/12; F16D 65/125; F16D 65/128; F16D 2065/13; F16D 2065/1304; F16D 2065/134; F16D 65/78; F16D 65/84; F16D 2065/1332; F16D 65/847; F16D 2065/1316
USPC .. 188/218 XL, 18 A, 264 R, 264 A, 264 AA
See application file for complete search history.

(56) References Cited

U.S. PATENT DOCUMENTS

| | | | |
|---|---|---|---|
| 2003/0178265 A1* | 9/2003 | Chen .................. | B62L 1/005 188/218 XL |
| 2008/0142319 A1* | 6/2008 | Manter ............... | B23K 1/0018 188/218 XL |
| 2012/0000736 A1* | 1/2012 | Koshiyama .......... | F16D 65/847 188/71.6 |
| 2013/0168193 A1* | 7/2013 | Iwai .................. | F16D 65/12 188/218 XL |
| 2015/0343518 A1* | 12/2015 | Ol .................... | B21D 53/86 188/218 XL |
| 2015/0345579 A1* | 12/2015 | Iwai et al. .......... | F16D 65/123 188/26 |

* cited by examiner

*Primary Examiner* — Pamela Rodriguez
(74) *Attorney, Agent, or Firm* — MH2 Technology Law Group, LLP

(57) ABSTRACT

A disc brake rotor including a friction portion and a cooling fin located radially offset from the friction portion is provided. The cooling fin is configured to deflect due to a change in temperature in the friction portion.

20 Claims, 6 Drawing Sheets

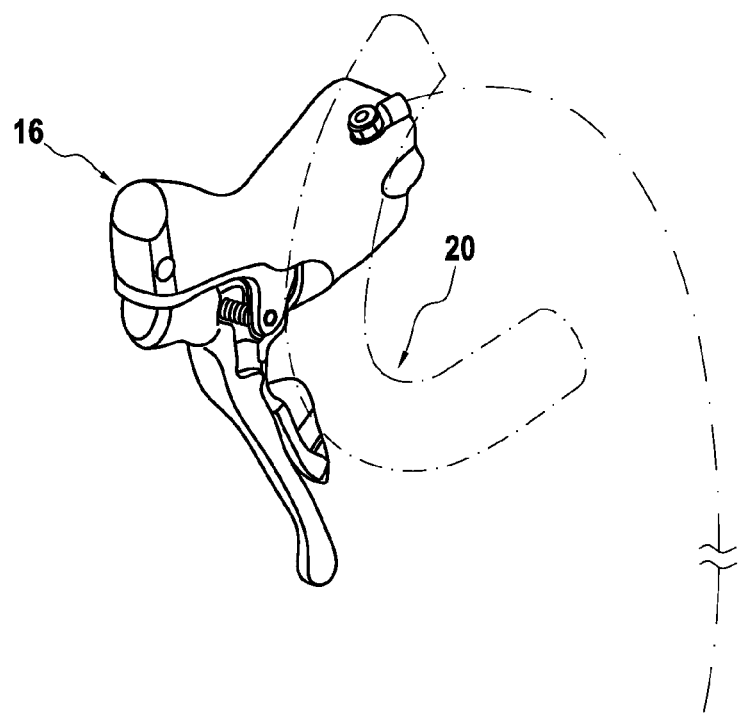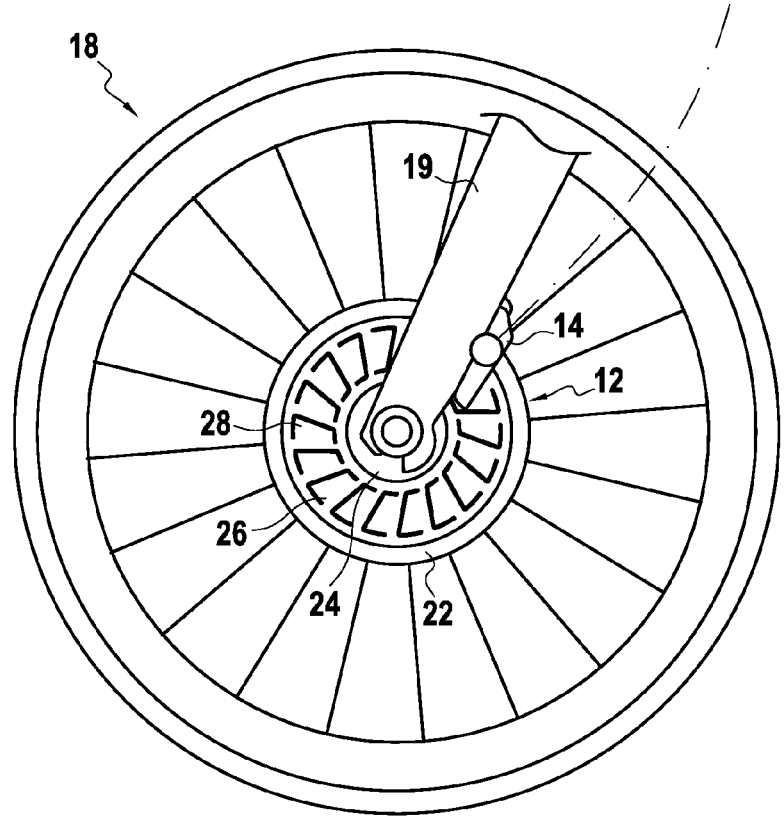
FIG.1

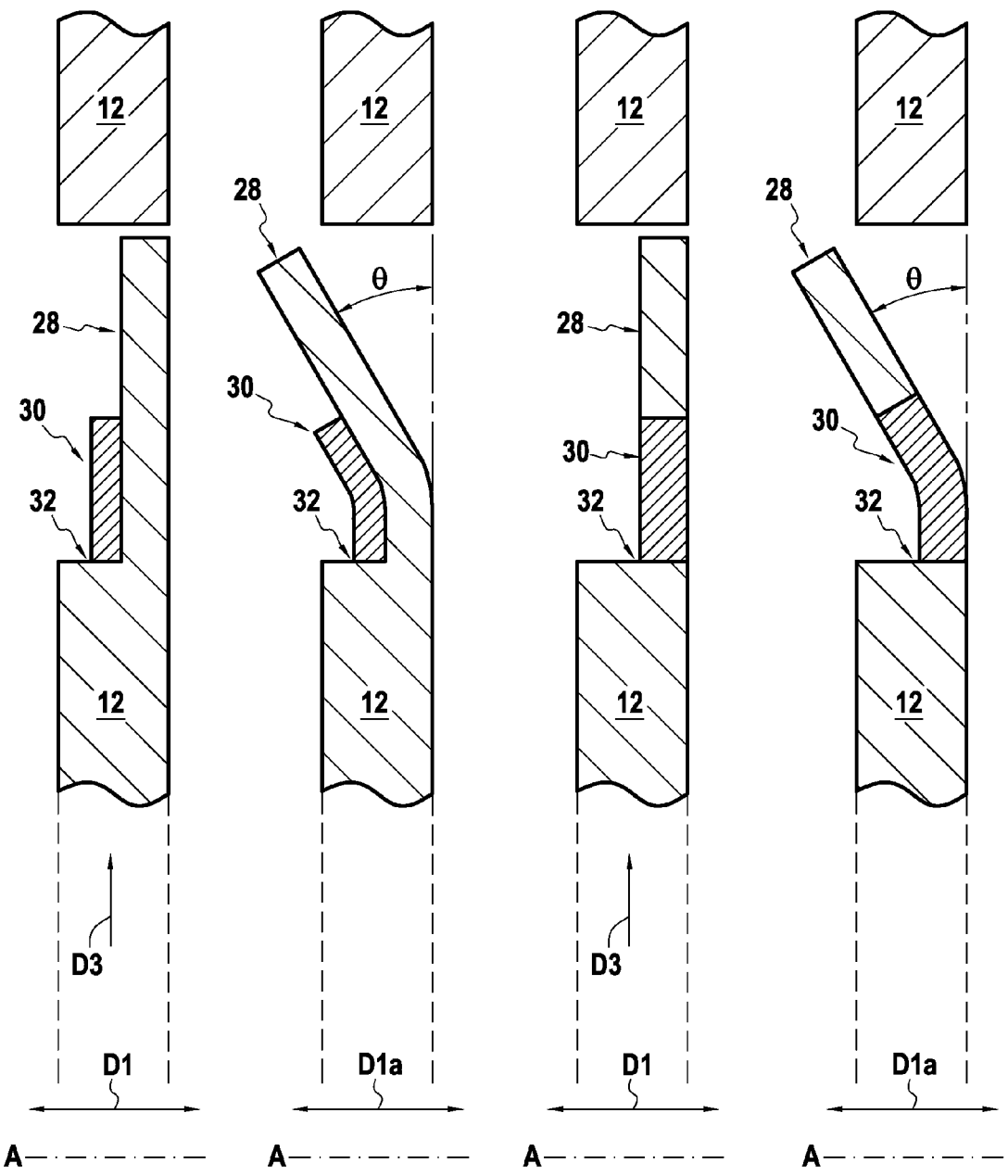

DISC BRAKE ROTOR

FIELD OF THE INVENTION

The present invention relates to braking systems for bicycles and more particularly, to a disc brake rotor for a bicycle having improved cooling properties.

BACKGROUND INFORMATION

Disc brake systems can provide relatively large braking forces as compared to an amount of force applied in actuating the operating (actuating) device. In addition, disc brake systems also tend to provide relatively uniform service in varying weather conditions. For these and other reasons, disc brake systems for bicycles have increased in popularity in recent years.

Disc brake systems include a disc brake rotor, a disc brake caliper including one or more brake pads, and an operating device configured to move the one or more brake pads toward the disc brake rotor. The operating device may be hydraulic, mechanical, electrical, and/or any other suitable actuator or combination thereof.

As the disc brake system is actuated, and the one or more pads are moved to be in contact with the disc brake rotor, frictional forces between the disc brake rotor and the one or more brake pads result in slowing and/or stopping of rotation of the disc brake rotor. Because the disc brake rotor may be mounted to a hub of a wheel, rotation of the wheel is also slowed and/or stopped.

SUMMARY

While disc brake systems provide excellent performance, frictional forces during braking generate heat, which should be dissipated. While some brake rotor designs have attempted to provide additional cooling, such designs can cause added drag and noise that may be undesirable for some riders.

The present disclosure is directed to providing a disc brake rotor for a bicycle that is configured to provide a desirable level of cooling to elements of the disc brake system while minimizing additional drag and noise.

According to embodiments of the present invention, a disc brake rotor including a friction portion, and a cooling fin located radially offset from the friction portion is provided. The cooling fin is configured to deflect due to a change in temperature in the friction portion.

By providing such a disc brake rotor, while the fin remains at rest (i.e., when the rotor remains relatively cool), aerodynamics of the bicycle remain unchanged, noise levels remain at a minimum, and extra air flow to the disc brake rotor is not provided. During braking, however, as the friction between the friction surface and braking elements generates heat, the temperature increase in the friction portion causes a related increase in the brake disc rotor itself, and the fin deflects relative to the temperature. Based on this deflection, additional airflow is provided to the brake disc rotor and greater cooling can be achieved.

The disc brake rotor includes a temperature sensitive portion. According to embodiments of the present invention, the cooling fin comprises the temperature sensitive portion and/or the temperature sensitive portion is operatively connected to the cooling fin to enable deflection of the cooling fin.

The temperature sensitive portion may include a bimetal material, in addition. The cooling fin may comprise a bimetal material.

According to some embodiments, the cooling fin has an at-rest position in which at least a portion of the cooling fin perpendicularly extends with respect to a rotation axis of the disc brake rotor.

A mounting portion configured to be mounted on a hub of a wheel may be provided, and in a deflected position, the cooling fin may extend towards the hub.

In a state in which the disc brake rotor is mounted on a bicycle, the cooling fin may extend towards a center plane direction of the bicycle in a deflected position of the cooling fin.

The disc brake rotor may include a mounting portion configured to be mounted on a hub of a wheel and a connecting portion connecting the mounting portion to the friction portion. The cooling fin may be provided on the connecting portion.

According to some embodiments, the cooling fin is radially inwardly located with respect to the friction portion.

A plurality of the cooling fins may be provided, the plurality of cooling fins being at least partially aligned in a circumferential direction of the disc brake rotor.

Also, a plurality of the cooling fins may be at least partially aligned in a radial direction of the brake disc rotor.

The cooling fin may extend in a circumferential direction of the disc brake rotor.

According to further embodiments of the present invention, a disc brake rotor is provided, the disc brake rotor including a friction portion, a cooling fin located radially offset from the friction portion, and a temperature sensitive portion operatively connected to the cooling fin to enable deflection of the cooling fin.

The temperature sensitive portion may include a bimetal material.

The cooling fin may have an at-rest position in which at least a portion of the cooling fin perpendicularly extends with respect to a rotation axis of the disc brake rotor.

A mounting portion may be provided, the mounting portion being configured to be mounted on a hub of a wheel, and in a deflected position, the cooling fin extends towards the hub.

When the disc brake rotor is mounted on a bicycle, the cooling fin may extend towards a center plane direction of the bicycle in a deflected position of the cooling fin.

According to still further embodiments of the present invention, a disc brake rotor is provided, the disc brake rotor including a friction portion, a mounting portion configured to be mounted on a hub of a wheel, a connecting portion connecting the mounting portion to the friction portion, and a cooling fin provided on the connecting portion and configured to deflect due to a change in temperature in the friction portion.

It is intended that combinations of the above-described elements and those within the specification may be made, except where otherwise contradictory.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles thereof.

BRIEF DESCRIPTION OF THE DRAWINGS

FIG. 1 shows an exemplary disc brake system;

FIGS. 4A-D are cross sections along BB of FIG. 2, showing exemplary fin and temperature sensitive portion configurations in at-rest and deflected positions;

DESCRIPTION OF THE EMBODIMENTS

Figure 2:
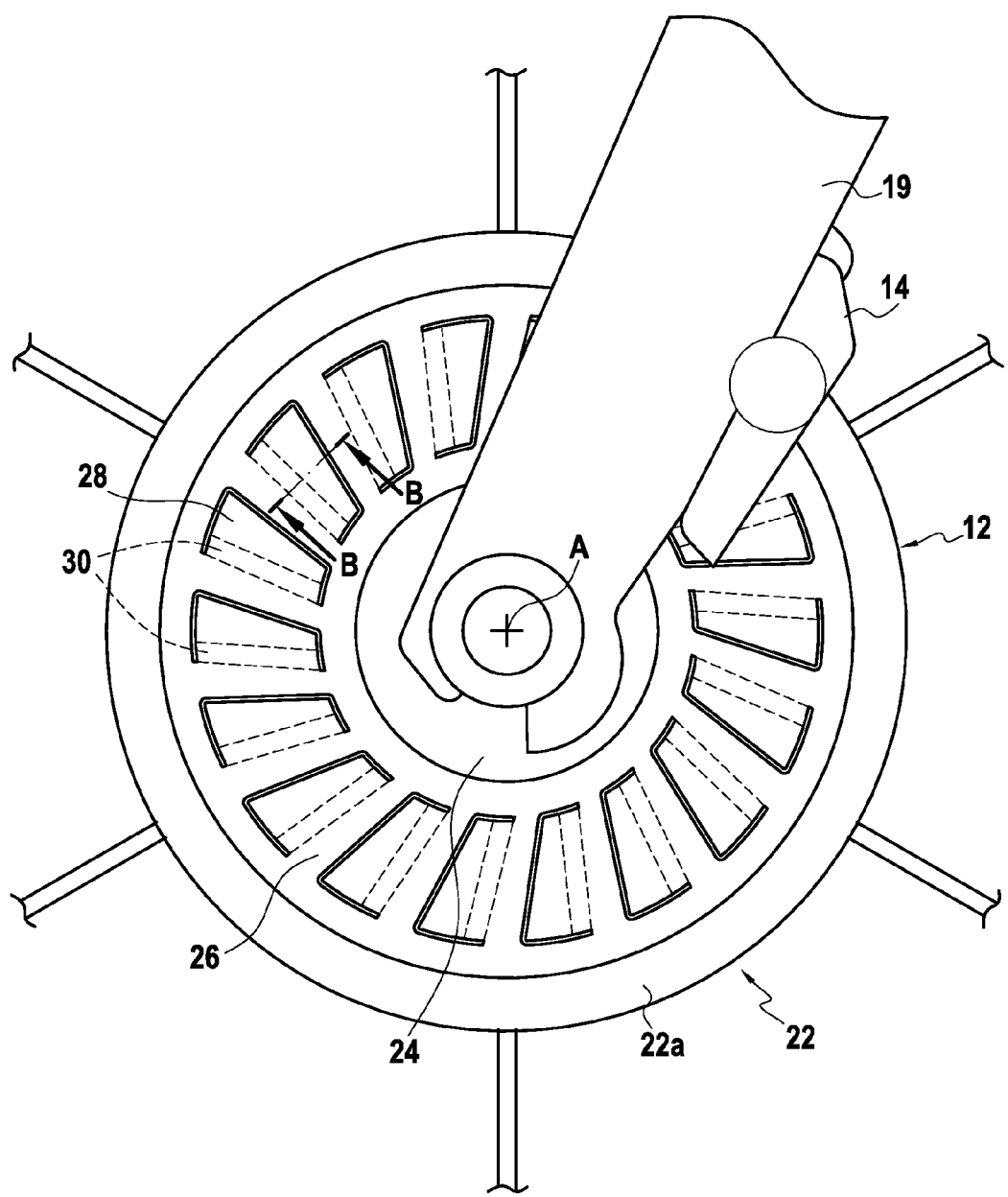
FIG. 2 shows a disc brake rotor according to a first embodiment of the present invention.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiments of the present invention are generally intended to provide variable cooling for a disc brake rotor as a temperature of the disc brake rotor changes during braking operations. Embodiments of the present invention will now be discussed with reference to the drawings.

FIG. 1 shows an exemplary disc brake system 10 for bicycles. The disc brake system 10 includes a disc brake rotor 12, a disc brake caliper 14, and an operating (actuating) device 16. Additionally, other exemplary bicycle components e.g., a wheel 18, a front fork 19, a handlebars 20, etc., are shown for purposes of aiding understanding of the present invention.

The disc brake rotor 12 in accordance with a first embodiment of the present invention includes a friction portion 22, a mounting portion 24, a connecting portion and a plurality of cooling fins 28, among others. The disc brake caliper 14 is mounted to the front fork 19, and is configured for selectively gripping or squeezing the disc brake rotor 12. More in detail, the disc brake caliper 14 is configured for selectively gripping the friction portion 22, to create friction thereby slowing and/or stopping rotation of the disc brake rotor 12, and hence the wheel 18. Selective gripping is achieved by operation of the operating device 16 mounted to, for example, the handlebars 20. During braking operations, heat is generated as a result of the friction between brake pads of the disc brake caliper 14 and the friction portion 22, the heat then passing, e.g., by conduction, throughout the disc brake rotor 12 and the disc brake caliper 14.

Because operation of the disc brake system 10 for performing a braking operation is conventional (e.g., interaction between brake pads and friction surface 22, etc.), further discussion of braking operations of the disc brake system 10 will not be undertaken herein. Moreover, while the exemplary disc brake system 10 illustrated herein is shown as a hydraulic braking system, the disc brake rotors 12 according to the present invention can be used with other types of braking systems as desired (e.g., mechanical, electro-mechanical, etc.).

The disc brake rotor 12 is configured to promote cooling of the disc brake rotor 12 in response to rising temperature of the disc brake rotor 12 (e.g., during a braking operation), and also to limit noise generation during periods where the temperature of the disc brake rotor 12 is not above a predetermined temperature.

The disc brake rotor 12 may comprise any suitable material, e.g., aluminum, steel, stainless steel, carbon fiber. As shown at FIG. 2, the disc brake rotor 12 further includes a temperature sensitive portion 30. Preferred materials of the disc brake rotor 12 may be corrosion resistant (e.g., aluminum alloys and/or stainless steel) and promote a desired coefficient of friction with certain other materials (e.g., materials configured to interact with the disc brake rotor 12). One of skill in the art will recognize that material mass may also be a consideration when implementing the disc brake rotor 12 according to the first embodiment of the present invention, and lightweight materials may be preferred.

As shown at FIG. 2, the disc brake rotor 12 is configured to rotate in conjunction with the wheel 18 around the rotational axis A. In addition, as a force is applied to the disc brake rotor 12, e.g., by the disc brake caliper 14, rotation of the disc brake rotor 12 about a rotational axis A is impeded and the force transferred to the wheel 18.

Figure 3A:
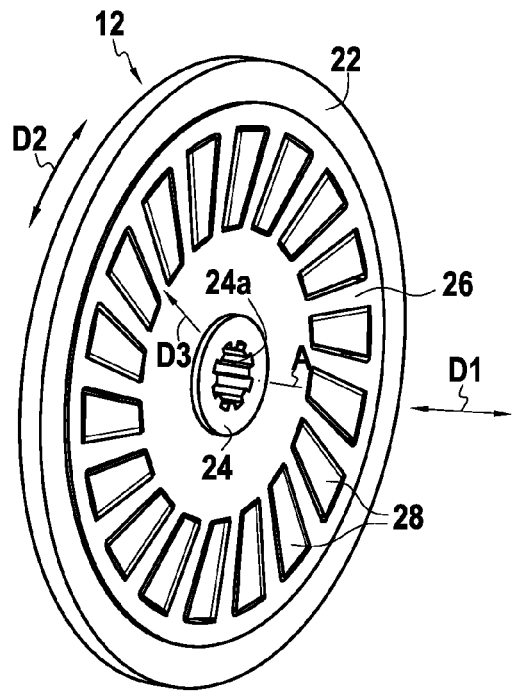
FIGS. 3A-B show various perspective views of the disc brake rotors according to the first embodiment of the present invention.
Figure 3B:
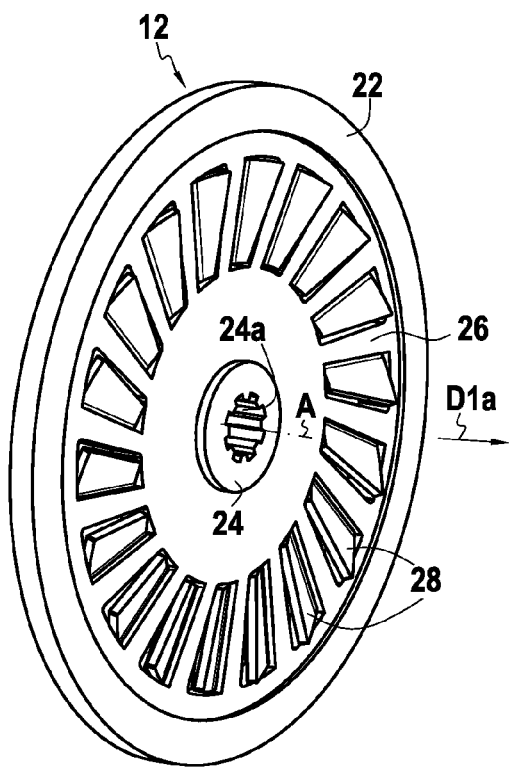
Figure 3C:
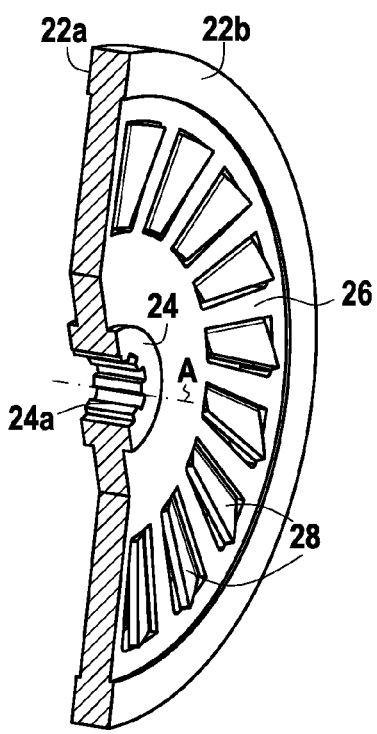
FIG. 3C shows an exemplary cross-section perspective view of the disc brake rotor of FIG. 3B.

FIGS. 3A-B show various perspective views of the disc brake rotor 12, while FIG. 3C shows an exemplary cross-section perspective view of the disc brake rotor 12 of FIG. 3B. The friction portion 22 has an annular shape. The friction portion 22 may comprise one or more surfaces, of the disc brake rotor 12. In the first embodiment, the friction portion comprises a first surface 22a, and a second surface 22b (see FIG. 3C). The first and second surfaces 22a and 22b face in opposite axial directions D1 of the disc brake rotor 12. The first and second surfaces 22a and 22b is configured to be gripped by brake pads (friction members) associated with the disc brake caliper 14 to generate a friction force. Therefore, the friction portion 22 is fabricated to provide desirable frictional characteristics (e.g., coefficient of friction) with regard to, for example, the friction members designed to be implemented with the disc brake caliper 14.

In addition, the friction portion 22 may be machined and/or otherwise fabricated to comprise various features (e.g., textures) configured to enhance frictional forces generated during interaction of the disc brake caliper 14 and the friction portion 22.

In the first embodiment, the friction portion 22 has a maximum thickness ranging from about 2.0 to 3.0 millimeters, for example approximately 2.4 millimeters. One of skill in the art will recognize that a suitable thickness may be implemented based on various factors such as, for example, weight considerations, size of the disc brake caliper 14, material strength, etc.

While FIG. 3C depicts the friction portion 22 having the first and second surfaces 22a and 22b of substantially equal radial dimensions, it may also be possible to implement the friction portion 22 having the first and second surfaces 22a and 22b with unequal radial dimensions, such that radial offset dimensions from at least one of the first and second surfaces 22a and 22b surfaces differ for elements present within the connecting portion 26.

The disc brake rotor 12 is configured to be fixedly attached to the wheel 18, e.g., via a hub of the wheel 18, such that application of a force to slow rotation of the disc brake rotor 12 also causes a slowing of rotation of the wheel 18. As shown at FIG. 3A, the mounting portion 24 is be integrally formed with the connecting portion 26 of the disc brake rotor 12. Alternatively, the connecting portion 26 may be provided as connecting arms (not shown) and the mounting portion 24 may be formed as separate member that is attached to inner ends of the connecting arms.

Mounting portion 24 includes a mounting opening 24a, which may optionally include splines as shown at FIG. 3A, for accommodating and providing engagement with the hub of the wheel 18. According to the engagement between the splines of the mounting opening 24a and protrusions provided on the hub, the disc brake rotor 12 is prevented to rotate about the rotational axis A relative to the hub. The mounting portion 24 is mounted to the hub by any suitable means, for example, one or more locking rings to prohibit an axial movement of the disc brake rotor 12 along the rotational axis A. Alternatively, the mounting portion 24 may be includes a plurality of through openings for mounting the disc brake rotor 12 to the hub by fasteners such as bolts.

The connecting portion 26 is disposed between the friction portion 22 and the mounting portion 24, and comprises the cooling fins 28. The connecting portion 26 may be formed integrally (i.e., as one piece) with the mounting portion 24 and the friction portion 22, for example, by forging, machining, stamping, etc., and/or any combinations of suitable methods. Alternatively, each of the mounting portion 24, the connecting portion 26, and the friction portion 22 may be formed from different materials and/or during different processes. These elements may then be subsequently assembled, for example, by welding or other suitable assembly process.

The cooling fins 28 are disposed radially offset from the friction portion 22. More in detail, the cooling fins 28 are disposed between the friction portion 22 and the mounting portion 24 such that the cooling fins 28 are radially inwardly located with respect to the friction portion 22. The cooling fins 28 are formed integrally with the connecting portion 26. Alternative the cooling fins 28 may be formed separately from the connecting portion 26, and subsequently joined with the connecting portion 26. In the first embodiment where the disc brake rotor 12 is formed integrally (i.e., the friction portion 22, the mounting portion 24, the connecting portion 26, and the cooling fins 28 formed in one process as a single piece), edges of the cooling fin 28, other than an coupling portion between the cooling fin 28 and the connecting portion 26, are separated from the connecting portion 26 by way of a cutting operation (e.g., laser cutting, stamping, etc.) so as to enable the cooling fin 28 to move freely with respect to the connecting portion 26, e.g., pivoting to deflect.

Alternatively, holes and/or cavities may be formed in the connecting portion 26 to accommodate the addition of the cooling fins 28, following formation of the holes and/or cavities. In such implementations, the cooling fins 28 may be affixed to connecting portion 26 by way of a bonding operation, e.g., welding, brazing, riveting, hinging, etc., so as to form operable connection.

The cooling fins 28 extend in any desirable direction along the connecting portion 26. For example, the cooling fins 28 extend in a circumferential direction D2 of the disc brake rotor 12 so as to have a width extending circumferentially along the disc brake rotor 12.

Alternatively, or in combination, cooling fins 28 may extend in a radial direction D3 of the disc brake rotor 12 so as to have a width extending radially along the disc brake rotor 12.

FIGS. 4A-B are cross sections along line BB of the disc brake rotor 12 of FIG. 2, showing the cooling fin 28 and the temperature sensitive portion 30 of the first embodiment in an at-rest and a deflected (i.e., elevated temperature) positions.

The cooling fin 28 is thermally connected to the friction portion 22 via the connecting portion 26 to enable transmission of heat (e.g., via conduction) from the friction portion 22 to the cooling fin 28. Where desirable, the cooling fins 28, the connecting portion 26, and the friction portion 22 may have differing thermal conductivities. For example, the connecting portion 26 and the cooling fins 28 may have higher thermal conductivity than the friction portion 22. Any combination of thermal conductivity for each component, as well as implementations in which uniform thermal conductivity is provided, are intended to fall within the scope of the present invention.

As one of skill in the art understands, as a temperature of the friction portion 22 rises, heat associated with the rise in temperature will be distributed, e.g., via conduction, throughout the disc brake rotor 12 and other components of the disc brake system 10, including the temperature sensitive portion 30.

As will be explained, the temperature sensitive portion 30 is configured to cause cooling fin 28 to deflect due to a change in temperature in the disc brake rotor 12, for example, at the friction portion 22 during a braking operation of the bicycle. As shown at FIG. 4A, in the first embodiment, the cooling fin 28 is provided on the connecting portion 26 as unitary member with the connecting portion 26. The cooling fin 28 directly extends from the connecting portion 22. The cooling fin 28 is thinner than the connecting portion 22 in the axial direction D1 and a step portion 32 are provided between the connecting portion 22 and the cooling fin 28 in the radial direction D3.

The temperature sensitive portion/member 30 is operatively connected to the cooling fin 28 to enable deflection of the cooling fin 28. In the first embodiment, the temperature sensitive portion 30 is disposed on the cooling fin 28 so as to contact the connecting portion 26 and the cooling fin 28. More in detail, the temperature sensitive portion 30 contacts the step portion 32 and the cooling fin 28. The temperature sensitive portion 30 faces the hub in a state where the disc brake rotor 12 is attached to the hub. It is to be understood that cooling fin 28 maintains an at-rest position, for example, as shown at FIG. 4A. When in the at-rest position, at least a portion of cooling fin 28 may remain perpendicular to the rotational axis A of the disc brake rotor 12, for example, as shown at FIG. 4A. The cooling fin 28 is configured to remain in the at-rest position up to a predetermined temperature $T_p$, for example, approximately 40 degrees Celsius.

As a temperature of the disc brake rotor 12 begins to exceed the predetermined temperature $T_p$, the cooling fin 28 deflects away from the at-rest position by a deflection angle θ as a result of force exerted by temperature sensitive portion 30, as shown at FIG. 4B. The term "deflect" and variants thereof, as used herein, are intended to refer to movement, e.g., pivoting of the cooling fin 28 with respect to the connecting portion 26 in response to temperature changes of the disc brake rotor 12, and more particularly, the temperature sensitive portion/member 30.

The temperature sensitive portion/member 30 comprises a temperature sensitive material such as a bimetal material. More in detail the temperature sensitive portion comprises, for example, a bimetallic strip, among others, configured to exert a force on the cooling fin 28 based on a change in temperature. Where temperature sensitive portion 30 comprises a bimetallic strip, two or more metal materials (e.g., steel and copper, steel and brass, etc.) may be bound together (e.g., by welding, brazing, riveting, etc.) to form a desired bimetallic strip.

The temperature sensitive portion 30 is operatively connected to the cooling fin 28 to enable exertion of force upon the cooling fin 28 to result in deflection as a change in temperature affects temperature the sensitive portion 30. The temperature sensitive portion 30 is bonded to cooling fin 28, for example, by a bonding process (e.g., welding, brazing, riveting, adhesive, etc.). As shown at FIG. 4A, the temperature sensitive portion 30 is connected to the cooling fin 28 such that upon a change in temperature of the temperature sensitive portion 30, a force exerted by the temperature sensitive portion 30 causes deflection of the cooling fin 28 at deflection angle θ with respect to the connecting portion 26.

Deflection angle θ depends upon the difference between the predetermined temperature $T_p$ and the actual temperature of $T_a$ of the disc brake rotor 12, and a function of temperature sensitive portion 30. Therefore, one of skill in the art will recognize that deflection angle θ may be configured as desired for various designs, and may range from approximately 5 degrees to 90 degrees, preferably approximately from 15 degrees to 60 degrees.

Where desirable, temperature sensitive portion may also be joined to connecting portion 26, for example, by welding. One of skill will recognize that such joining is optional.

Alternatively, or in conjunction to the above, a portion or all of the cooling fin 28 may comprise temperature sensitive portion 30, as shown at FIGS. 4C and 4D. In such a configuration, the cooling fin 28 may be joined to the connecting portion 26 by way of the temperature sensitive portion 30, e.g., by bonding temperature sensitive portion 30. Such bonding may be accomplished by any suitable process, such as, for example, welding, brazing, etc.

Figure 5A:
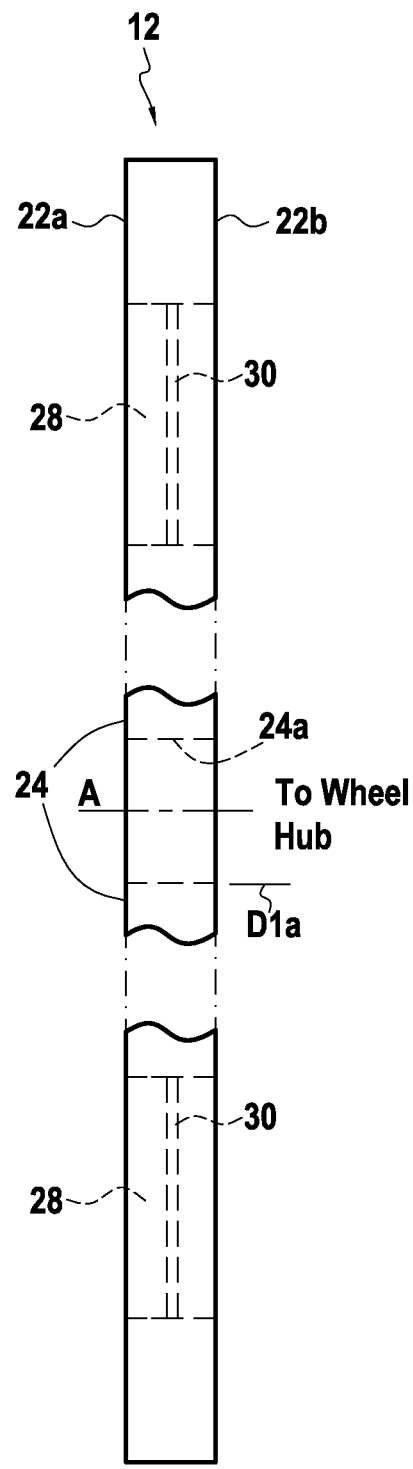
FIGS. 5A and B show exemplary profile views of the disc brake rotor of FIG. 2.
Figure 5B:
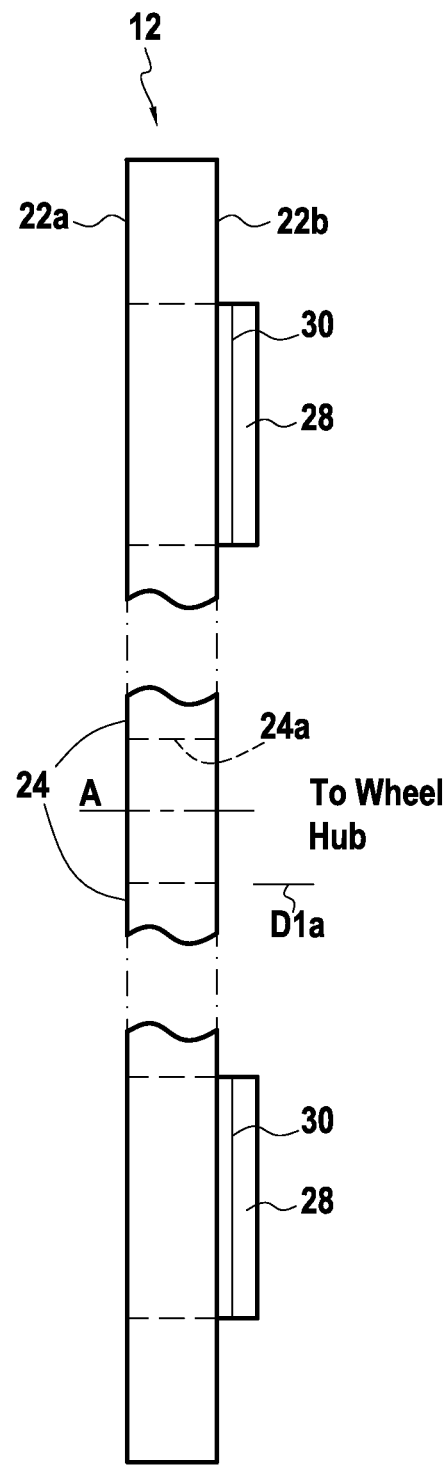

FIGS. 5A and B show exemplary profile views of the disc brake rotor 12 of FIG. 1, FIG. 5A showing a profile with the cooling fin 28 in an at-rest position and FIG. 5B showing the profile with the cooling fin 28 in a deflected position. According to the first embodiment, the cooling fin 28 may be configured to preferably deflect towards a center plane direction D1a of the bicycle, i.e., toward the hub of the wheel 18 as shown at FIG. 5B. The center plane direction D1a is one of the axial directions D1. However, where desired, it may be possible to implement cooling fin 28 such that deflection occurs in a direction away from the wheel 18.

The disc brake rotor 12 includes a plurality of cooling fins 28 at least partially aligned in the circumferential direction of the disc brake rotor 12. For example, two, three, four, five, six, ten, etc. cooling fins 28 may be provided. Such a plurality of the cooling fins 28 are annularly distributed about the rotational axis A of the disc brake rotor 12 and circumferentially spaced apart from each other, for example, so as to promote desirable wheel balance, among others.

Figure 6:
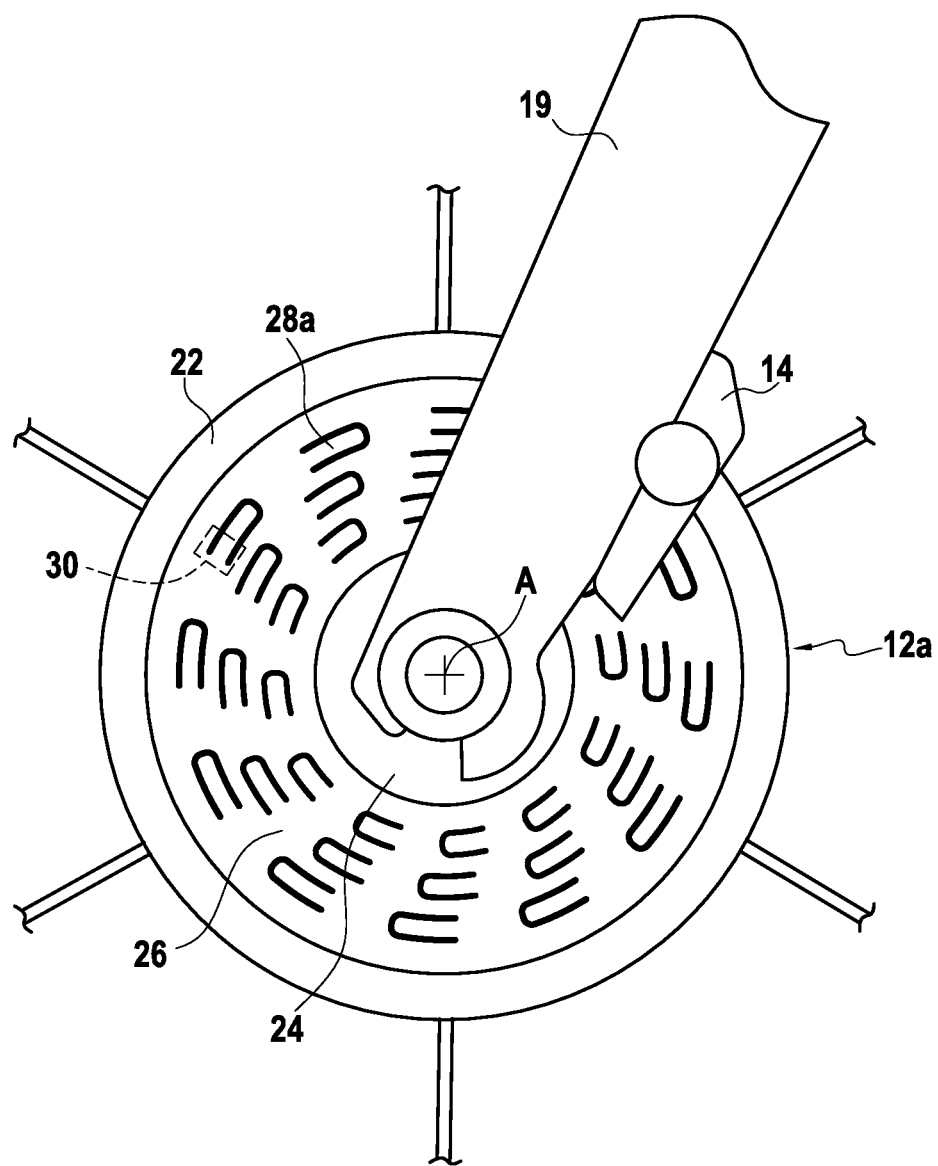
FIG. 6 shows a disc brake rotor according to a second embodiment of the present invention.

Alternatively, FIG. 6 shows a disc brake rotor 12a of a second embodiment. The disc brake rotor 12a has the same configuration as the disc brake rotor 12 except for arrangement of cooling fins. Thus, elements having substantially the same function as those in the first embodiment will be numbered the same here, and will not be described and/or illustrated again in detail here for the sake of brevity. In this disc brake rotor 12, a plurality of cooling fins 28a at least partially aligned in a radial direction of the disc brake rotor 12a. Again, such a plurality of cooling fins 28a are annularly distributed about the rotational axis A of the disc brake rotor 12a and circumferentially spaced apart from each other, for example, so as to promote desirable wheel balance, among others.

By providing the disc brake rotors 12 and 12a according to embodiments of the present invention, significant improvements in cooling may be achieved when such cooling is desirable, i.e., when temperature of the disc brake rotor 12 and 12a elevated. In addition, because the cooling fins 28 and 28a are configured to return to an at-rest position when additional cooling would not provide any additional benefit, noise produced by deflected cooling fins 28 and 28a is eliminated.

While only selected embodiments have been chosen to illustrate the present invention, it will be apparent to those skilled in the art from this disclosure that various changes and modifications can be made herein without departing from the scope of the invention as defined in the appended claims. For example, the disc brake system 10 has been discussed and shown in the Figures as a front disc brake (i.e., mounted on the front wheel of a bicycle). However, one of ordinary skill will recognize that such a disc brake system 10 could be equally well implemented as a rear disc brake (i.e., mounted on the rear wheel of a bicycle).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives.

Specific values for described elements should be understood to be within accepted manufacturing or industry tolerances known to one of skill in the art, and any use of the terms "substantially" and/or "approximately" and/or "generally" should be understood to mean falling within such accepted tolerances.

It is intended that the specification and examples be considered as exemplary only, with a true scope of the disclosure being indicated by the following claims.

What is claimed is:

1. A disc brake rotor comprising:
   a friction portion; and
   a cooling fin located radially offset from the friction portion,
   the cooling fin being configured with a temperature sensitive portion to deflect due to a change in temperature in the friction portion such that additional airflow is provided to the disc brake rotor.

2. The disc brake rotor according to claim 1, comprising the temperature sensitive portion.

3. The disc brake rotor according to claim 2, wherein the cooling fin comprises the temperature sensitive portion.

4. The disc brake rotor according to claim 2, wherein the temperature sensitive portion is operatively connected to the cooling fin to enable deflection of the cooling fin.

5. The disc brake rotor according to claim 2, wherein the temperature sensitive portion comprises a bimetal material.

6. The disc brake rotor according to claim 1, wherein the cooling fin comprises a bimetal material.

7. The disc brake rotor according to claim 1, wherein the cooling fin has an at-rest position in which at least a portion of the cooling fin perpendicularly extends with respect to a rotation axis of the disc brake rotor.

8. The disc brake rotor according to claim 1, comprising a mounting portion configured to be mounted on a hub of a wheel, and in a deflected position, the cooling fin extends towards the hub.

9. The disc brake rotor according to claim 1, wherein, in a state in which the disc brake rotor is mounted on a bicycle, the cooling fin extends towards a center plane direction of the bicycle in a deflected position of the cooling fin.

10. The disc brake rotor according to claim 1 comprising
    a mounting portion configured to be mounted on a hub of a wheel, and
    a connecting portion connecting the mounting portion to the friction portion,
    wherein the cooling fin is provided on the connecting portion.

11. The disc brake rotor according to claim 1, wherein the cooling fin is radially inwardly located with respect to the friction portion.

12. The disc brake rotor according to claim 1, comprising a plurality of cooling fins at least partially aligned in a circumferential direction of the disc brake rotor.

13. The disc brake rotor according to claim 1, comprising a plurality of cooling fins at least partially aligned in a radial direction of the disc brake rotor.

14. The disc brake rotor according to claim 1, wherein the cooling fin extends in a circumferential direction of the disc brake rotor.

15. A disc brake rotor comprising:
    a friction portion;
    a cooling fin located radially offset from the friction portion; and
    a temperature sensitive portion operatively connected to the cooling fin to enable deflection of the cooling fin.

16. The disc brake rotor according to claim 15, wherein the temperature sensitive portion comprises a bimetal material.

17. The disc brake rotor according to claim 15, wherein the cooling fin has an at-rest position in which at least a portion of the cooling fin perpendicularly extends with respect to a rotation axis of the disc brake rotor.

18. The disc brake rotor according to claim 15, comprising a mounting portion configured to be mounted on a hub of a wheel, and in a deflected position, the cooling fin extends towards the hub.

19. The disc brake rotor according to claim 15, wherein, in a state in which the disc brake rotor is mounted on a bicycle, the cooling fin extends towards a center plane direction of the bicycle in a deflected position of the cooling fin.

20. A disc brake rotor comprising:
    a friction portion;
    a mounting portion configured to be mounted on a hub of a wheel;
    a connecting portion connecting the mounting portion to the friction portion; and
    a cooling fin provided on the connecting portion and configured with a temperature sensitive portion to deflect due to a change in temperature in the friction portion such that additional airflow is provided to the disc brake rotor.

\* \* \* \* \*